(12) United States Patent
Vairavan et al.

(10) Patent No.: US 12,284,364 B2
(45) Date of Patent: Apr. 22, 2025

(54) MACHINE LEARNING (ML)-BASED RATE CONTROL ALGORITHM TO FIND QUANTIZATION PARAMETER (QP)

(71) Applicant: Sony Interactive Entertainment Inc., Tokyo (JP)

(72) Inventors: Kannan Vairavan, San Mateo, CA (US); Milan Mehta, San Mateo, CA (US)

(73) Assignee: Sony Interactive Entertainment Inc.

( * ) Notice: Subject to any disclaimer, the term of this patent is extended or adjusted under 35 U.S.C. 154(b) by 81 days.

(21) Appl. No.: 18/179,256

(22) Filed: Mar. 6, 2023

(65) Prior Publication Data
US 2024/0305789 A1 Sep. 12, 2024

(51) Int. Cl.
*H04N 19/149* (2014.01)
*H04N 19/172* (2014.01)
*H04N 19/184* (2014.01)

(52) U.S. Cl.
CPC ......... *H04N 19/149* (2014.11); *H04N 19/172* (2014.11); *H04N 19/184* (2014.11)

(58) Field of Classification Search
None
See application file for complete search history.

(56) References Cited

U.S. PATENT DOCUMENTS

| | | | |
|---|---|---|---|
| 2019/0043201 A1* | 2/2019 | Strong | G06V 10/96 |
| 2019/0132591 A1* | 5/2019 | Zhang | H04N 19/59 |
| 2021/0067785 A1* | 3/2021 | Zhang | H04N 19/159 |
| 2022/0385907 A1 | 12/2022 | Zhang et al. | |
| 2024/0163436 A1* | 5/2024 | Li | H04N 19/61 |

OTHER PUBLICATIONS

"International Search Report and Written Opinion", dated Apr. 17, 2024, from the counterpart PCT application PCT/US24/11332.

* cited by examiner

*Primary Examiner* — Rebecca A Volentine
(74) *Attorney, Agent, or Firm* — Fish & Richardson P.C.

(57) ABSTRACT

A ML model that may be implemented by plural sub-modules including a Random Forest model is used to generate a quantization parameter (QP) for a video encoder based on various encoding factors input to the ML model including frame size and channel rate.

19 Claims, 7 Drawing Sheets

FIG. 5 Machine Learning Based QP Control Algorithm

FIG. 6 Bit Per Frame Machine Learning Module

R-λ -> R(λ) Lagrangian Multiplier - RDO $$\frac{R[k]}{N_{Pixels}[k]} = MAD_p[k] \times \left( \frac{x_1[k]}{Q_\delta^2[k]} + \frac{x_2[k]}{Q_\delta[k]} \right), \quad 700$$

Where The Gradient Of A Function Points In The Same Direction As The Gradients Of Its Constraints Formula
$\mathcal{L}(x,\lambda) = f(x) - \lambda g(x)$
$\mathcal{L}$ = Lagrangian
$\lambda$ = Lagrange Multiplier
$g(x)$ = Equality Constraint
$f(x)$ = Function
$x$ = Integer $J = D + R\lambda$ For Every MB, J Is RD Cost
$QP = c_1 \times \ln(\lambda) + c_2$, C1 And C2 Are Complexity
$D = CR^{-k}$, $\lambda = \alpha\, bpp^\beta$
$c, k, \alpha, \beta$ Are Content Related Parameters.

FIG. 7

Autocorr = ifft( Complex( abs(fft(ImageData, n=2*N-1))**2, 0 )) Or
Autocorr = ifft( abs(fft(ImageData, 2*N-1)).^2)

FIG. 9 Machine Learning Based CTU Quantization Module

FIG. 10 Encoding Operation

FIG. 11 Training Frame Bit Module

FIG. 12 Training QP Module

MACHINE LEARNING (ML)-BASED RATE CONTROL ALGORITHM TO FIND QUANTIZATION PARAMETER (QP)

FIELD

The present application relates generally to machine learning (ML) to find an optimal quantization parameter (QP) for a video encoder.

BACKGROUND

Video encoders use a quantization parameter (QP) (also referred to herein as a quantization factor or quantization value) for compression of Moving Picture Experts Group (MPEG) video frames, including intra-frames (I-frames), predicted frames (P-frames), and bidirectional frames (B-frames). Both P-frames and B-frames are based on I-frames and are smaller than I-frames to achieve a smaller data payload than would be possible if only full scale I-frames were used. The encoder uses a QP in generating these frames to optimize video quality.

As understood herein, current techniques to produce an optimum QP for video encoders either fall short of optimizing QP and/or require excessive processing power, as is the case for, e.g., so-called two-pass computation encoding. Further, current techniques to produce an optimum QP for video encoders may cause video rate buffer overflow or underflow conditions depending on variable transmission channel characteristics.

SUMMARY

Accordingly, machine learning is used to generate a dynamic string of QPs to a video encoder.

In detailed examples, QPs for frames other than I-frames (also referred to herein as reference frames) are generated by an ML model. In some examples, one ML model per encoder type is provided, i.e., the ML models described herein may be tailored to encoder types, such that a first ML model is used to generate QPs for non-reference frames for a first encoder type and a second ML model is used to generate QPs for non-reference frames for a second encoder type.

With this introduction in mind, an apparatus includes at least one processor configured to input to at least one machine learning (ML) model at least one non-intraframe (I-frame), at least one reference video frame, and at least a representation of bits for a video frame. The processor is configured to provide output from the ML model to at least one video encoder. The output includes at least a quantization parameter (QP). The processor is configured to execute the video encoder to output at least one video frame based at least in part on the QP.

In example embodiments, the representation of bits for a video frame is received from the video encoder.

In example embodiments, the processor is configured to input to the ML model encoded bits of at least one block of an encoded video frame.

In some implementations the processor is configured to input to the ML model a representation of energy of discrete cosine transform (DCT) of the block of the encoded video frame.

The processor can be configured to input to the video encoder the at least one non-I-frame and the at least one reference video frame.

The ML model can include at least one random forest model.

In some embodiments a first module of the ML model outputs a representation of estimated bits for at least one video frame to at least a second module of the ML model. In these embodiments, the first module is for receiving the non-I-frame, the at least one reference video frame, and the representation of bits for a video frame, with the first module for outputting the representation of estimated bits to the video encoder and to the second module. The second module can be configured to receive from the encoder the encoded bits of at least one block of an encoded video frame and output to the video encoder the QP. Moreover, the second module can be configured to receive from the video encoder a representation of energy of DCT of the at least one block of the encoded video frame.

In another aspect, a method includes providing to at least a first machine learning (ML) module at least one indication of video transmission channel rate. The method further includes providing output of the first ML module to at least a second ML module. The output of the first ML module includes at least an estimated number of bits for at least a portion of at least one video frame. Further, the method includes providing output of the second ML module to at least one video encoder. The output of the second ML module includes at least one quantization parameter (QP). According to this method, the QP is used by the video encoder to generate at least one video frame for transmission over a video transmission channel.

In another aspect, an apparatus includes at least one computer storage medium that is not a transitory signal and that in turn includes instructions executable by at least one processor to input video encoding information to at least one machine learning (ML) model. The instructions are executable to provide output of the ML model to at least one video encoder. The output includes at least a quantization parameter (QP). The instructions are executable to execute the video encoder to generate video information using the QP.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system includes one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 1:
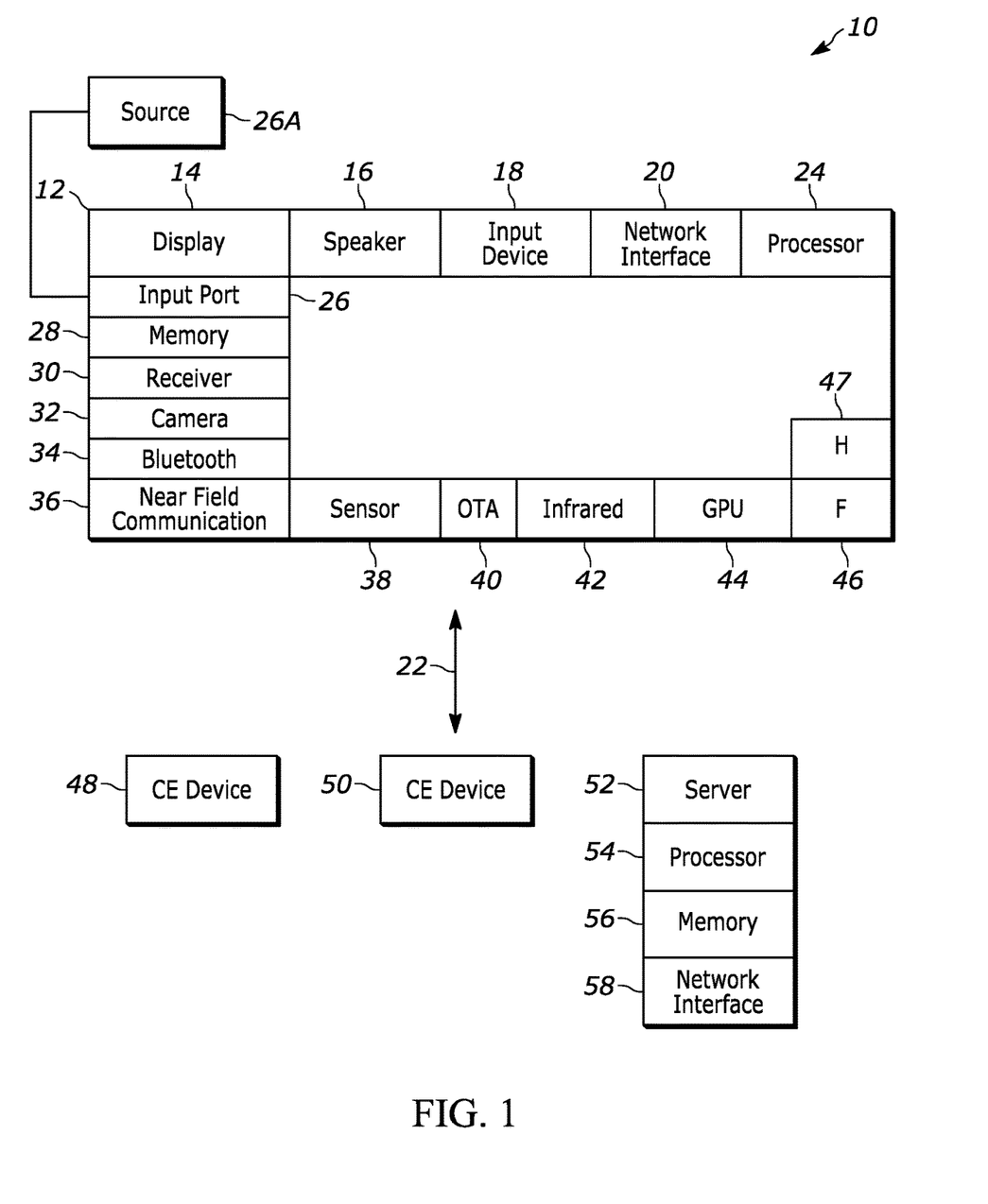
FIG. 1 is a block diagram of an example system in accordance with present principles.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers. A specific type of ML model that may be used is a Random Forest (RF) model, which is a type of non-convolutional neural network.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
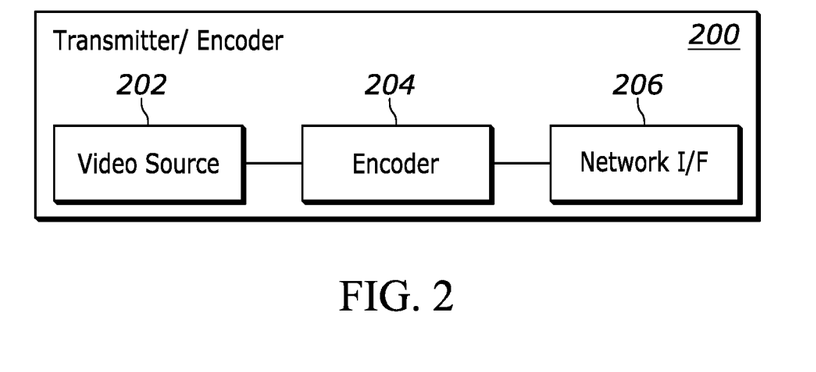
FIG. 2 is a block diagram of an example encoder device consistent with present principles.

Now in reference to FIG. 2, at least one example transmitter/encoder device 200 is shown. The device 200 may be established by, for example, a device of FIG. 1 such as one or more servers maintaining and managing a VCN to provide GOPs of video. The video may be established by computer game video or other interactive video, or even video for other audio/video content such as motion pictures, Internet-based tube videos, videos embedded in websites, videos streamed to a set top box through cable and satellite connections, videos provided through dedicated software applications (apps), etc.

Accordingly, FIG. 2 shows a video source 202 of the video, which may be established by persistent storage such as hard disk drives and/or solid state drives on the device 200 or cloud server or other source. A processor in the device 200 (not shown) may thus access video from the source 202 and pass the video through an encoder 204 to encode GOPs for the video and provide the encoded GOPs to a network interface 206 of the device 200 for transmission to one or more receiver/decoder devices. The network interface 206 may be a computer network interface, a wireless telephony interface, a television broadcast or satellite or terrestrial broadcast interface, etc.

Without limitation, the encoders and decoders herein may operate under a variety of standards including ITU MPEG2, H.264/AVC, H.265/HEVC, H.266/VVC, AV1, VP8, VP9, MPEG5-Part1/EVC/Essential Video Coding, and MPEG5-Part2/LCEVC/Low Complexity enhancement Video Coding.

Figure 3:
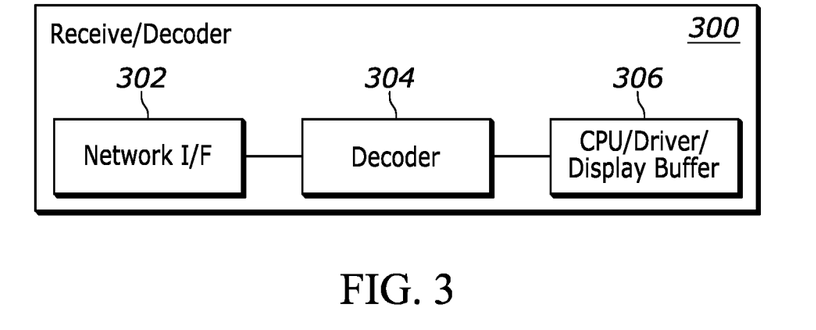
FIG. 3 is a block diagram of an example decoder device consistent with present principles.

Now in reference to FIG. 3, at least one example receiver/decoder device 300 is shown. The device 300 may receive the video of FIG. 2 via GOPs from the transmitting device 200. The device 300 may be established by, for example, a device of FIG. 1 such as a personal computer like a desktop computer, laptop computer, smartphone, headset like smart glasses or augmented or virtual reality headset, etc. Additionally or alternatively, the device 300 may be established by a computer game console, a television, a set top box, etc.

As shown in FIG. 3, the device 300 may include a network interface 302 that may receive the video/GOPs from the device 200 over a wired LAN or Wi-Fi Internet connection, a cable or satellite connection, a 5G or other wireless cellular Internet connection, etc. As such, in various examples the network interface 302 may be a computer network interface, a wireless telephony interface, a television broadcast or satellite or terrestrial broadcast interface, etc.

As the interface 302 receives GOPs from the device 200, the interface 302 may provide the GOPs to a decoder 304 to decode the GOPs. The decoder 304 may then provide the decoded GOPs to a central processing unit (CPU) or other processor of the device 300, and/or to a display driver that controls a display connected to the device 300, for placement of the GOPs into a display buffer maintained at the device 300.

For I-frames, a predetermined/predefined QP may be used for an initial/first frame of a GOP (an independent I frame) and may be set by a designer, programmer, etc. QP for this frame may therefore be fixed (e.g., the frame does not go through any processing to get the QP value). The rest of the I frames and non-I frames for the GOP may go through the loop process set forth herein and get a QP value. Accordingly, for periodic I frames of remaining frames in the same GOP and that are for a same scene within the GOP, the QP may be computed as the average of the QP of the last frame and the QP of the last I frame. For non-periodic I frames of the same GOP but that establish a scene change/different scene, the QP may be computed as the average QP from the past I frames of the same GOP. F For non-I frames, the QP may be derived from the ML models described below.

Figure 4:
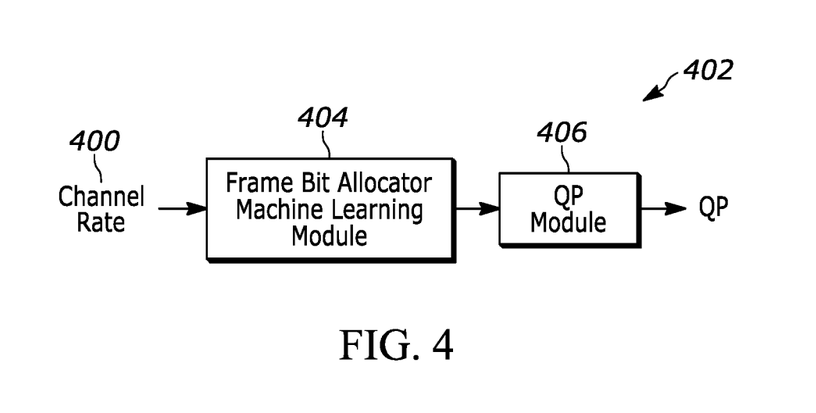
FIG. 4 is a schematic diagram of overall example software architecture consistent with present principles.

Accordingly and to this latter end, in FIG. 4, video encoding information 300 such as an actual or target channel rate is input to a machine learning (ML) model, generally designated 402. In the example shown, the video encoding information is input to a dynamic frame bit allocator module 404, the output of which is input to a QP module 406, which outputs, for each one plural regions or slices or macroblocks or coding tree units (CTUs) or other portions of a video frame, a respective quantization parameter (QP) for use by an encoder such as the encoder shown in FIG. 2 in encoding the respective portions of the respective video frame for storage or transmission of the video frame to a player. One or both of the modules shown in FIG. 4 may be implemented by non-convolutional neural networks such as Random Forest networks.

Figure 5:
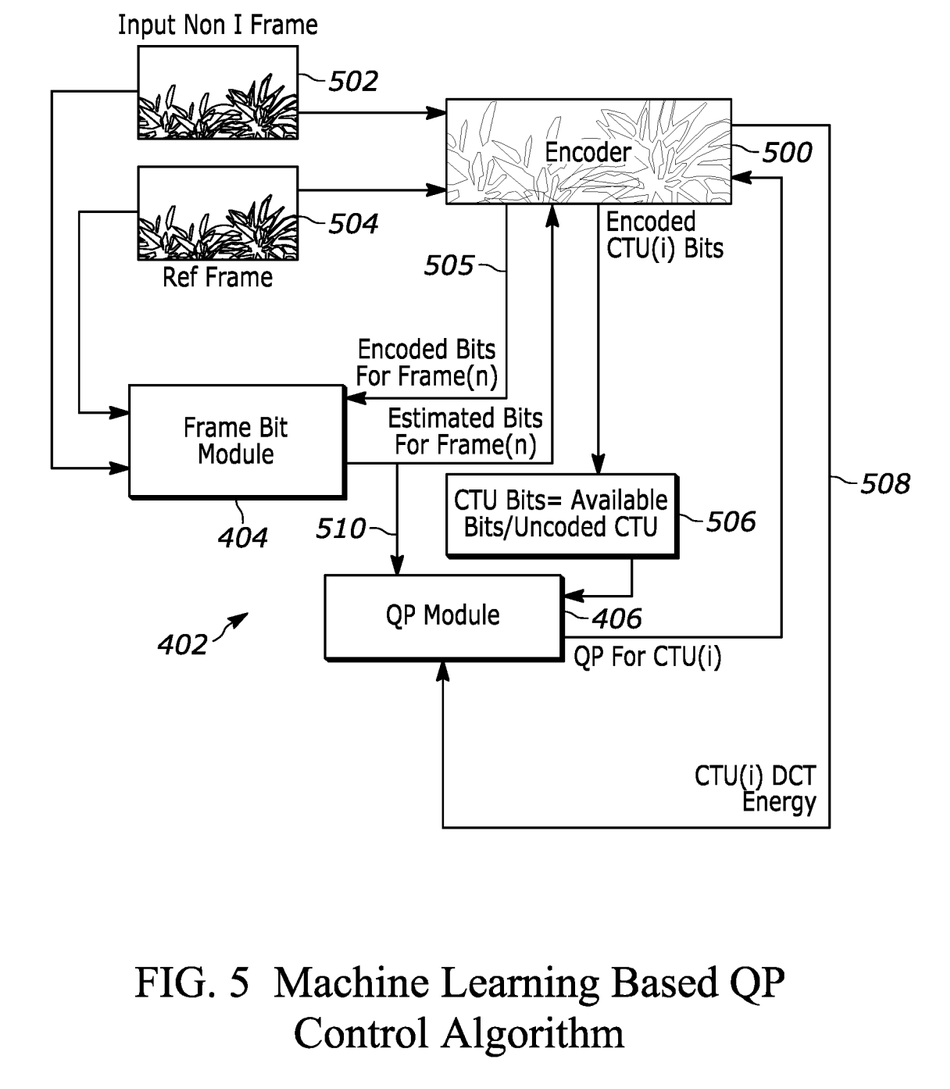
FIG. 5 illustrates and example ML model architecture.

Turn now to FIG. 5, which shows a video encoder 500 such as but not limited to any of the video encoders described herein. To encode video, a non-I frame 502 (such as a B-frame or P-frame) and a reference frame 504 (such as an I-frame) are input to the encoder 500. Also, the frames 502, 504 are input to the ML model 402, in the example, to the frame bit module 404 shown in FIG. 4.

Additional video encoding data is input to the ML model. For example, as indicated at 505 the encoded bits for a previous ($n^{th}$) frame and/or a number representing the number of such bits are input to the frame bit module 404 from the encoder 500. Furthermore, the encoder 500 can input to the QP module 406 a representation 506 of the encoded bits of at least one block (such as a CTU) of an encoded video frame. Also, as indicated at 508 the encoder 500 can provide a representation of energy of discrete cosine transform (DCT) of the at least one block of an encoded video frame.

As shown at 510 in FIG. 5, the frame bit module 404, based on its inputs, outputs to both the encoder 500 and to the QP module 406 a representation of estimated (or target) bits for at least one video frame. In turn, based on its inputs (506, 508, 510), the QP module 406 outputs a QP for the current portion of frame being encoded (such as a CTU) a QP to the encoder 500. The feedback loops shown in FIG. 5 continue for each successive frame (or portion of frame such as a CTU) that the encoder 500 encodes.

It may now be appreciated that based on training, the ML model 402 shown in FIGS. 4 and 5 and described above outputs to an encoder both a QP for all or part (such as a CTU) of a frame for encoding the frame, as well as providing to the encoder a target or estimated number of bits for the frame (or portion of the frame).

Figure 6:
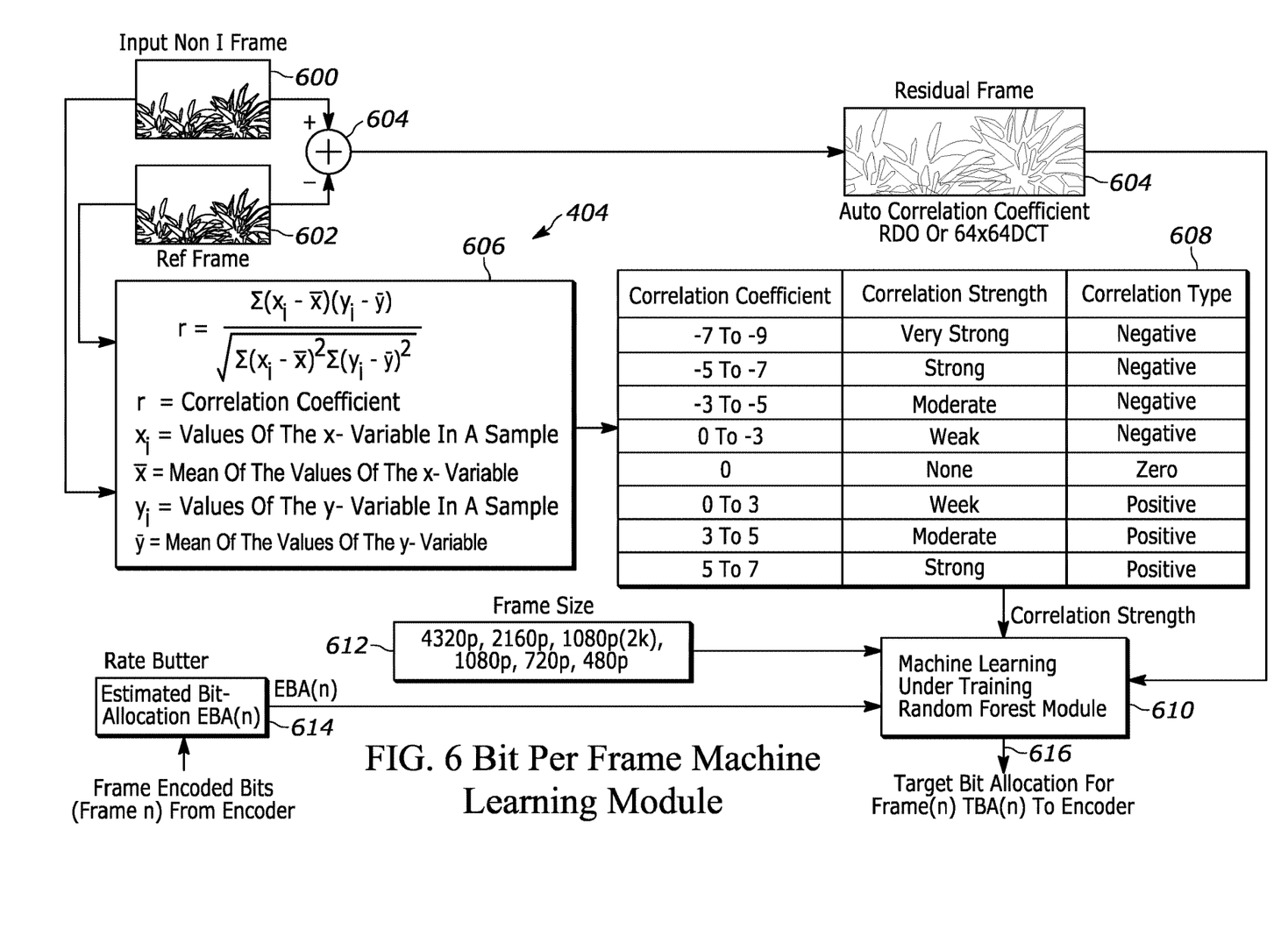
FIG. 6 illustrates details of the Frame Bit Module shown in FIG. 5.

FIG. 6 illustrates details of the frame bit module 404 during training. Non-I-frames and I-frames 600, 602 are summed at 604 to produce a residual frame 604, and are also input directly to a correlation coefficient block 606 which provides a correlation coefficient "r" to a correlation strength block 608. The correlation coefficient "r" is the quotient of the terms illustrated in FIG. 6, block 606 and is sometimes referred to as a Pearson correlation coefficient with value between −1 and 1. In the equation of block 606, $x_i$ and $y_i$ are the values of the $i^{th}$ variables in the sample and the x and y values with lines above them represent means of the respective values.

The correlation strength block 608 in FIG. 6 maps ranges of correlation coefficients in the left hand column to subjective correlation strength in the center column and correlation type (zero, positive, or negative) in the right column.

As shown in FIG. 6, the correlation strength from the strength block 608 is input to a ML model 610 under test, which will establish the frame bit module 404 in FIGS. 4 and 5. The ML model 610 under test also receives the residual frame 604, an indication 612 of the size of the frame being encoded, and a ground truth estimated (or target) number of bits from a rate buffer 614. The ML model 610 tests on this input data to minimize the difference between the output 616 of the ML model 610 and the ground truth target from the rate buffer 614.

Figure 7:
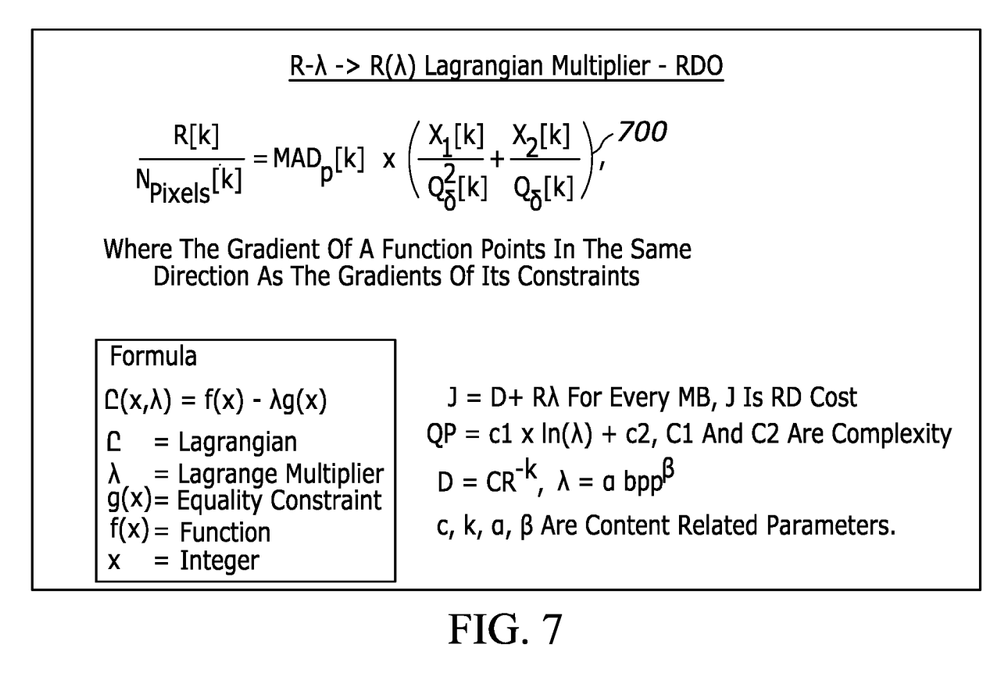
FIGS. 7 and 8 illustrate equations pertinent to training.
Figure 8:
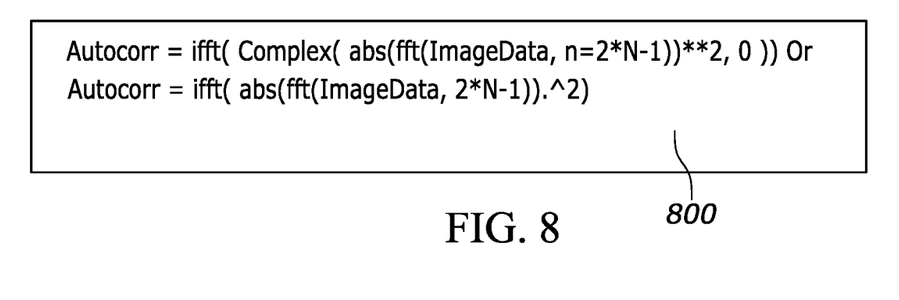

FIGS. 7 and 8 illustrate equations 700, 800, respectively to further discuss training of the ML Frame Bit module 404, which include, as mentioned above, the correlation coefficient between video frames, frame size and frame bits. An auto correlation coefficient/RDO/DCT strength may also be used and is illustrated in FIG. 8.

With respect to the correlation coefficient, the Pearson correlation coefficient (r) is the most common way of measuring a linear correlation. It is a number between −1 and 1 that measures the strength and direction of the relationship between two variables. This will give the relationship between frames which will help to predict Frame Bits. Correlation coefficient strength is then converted from the coefficient as shown in block 608 of FIG. 6.

With respect to frame size, a frame may be divided into parts, such as slices/tiles of CTU (128×128). Allocating the right number of bits by setting a right QP determines video quality.

With respect to frame encoded bits in a feedback loop such as that shown in FIG. 5, the feedback loop is updated available bits periodically after every frame is coded and give direction to the ML Module to pick a right number of bits needed for the frame.

With respect to auto correlation coefficient/Rate Distortion Optimization (RDO)/DCT, any one of these three factors help to find the correlation within the residual frame 604 shown in FIG. 6. The QP is determined based on the Auto correlation coefficient strength which is a robust method to find the spectrum of the signal. RDO (FIG. 7) can also help to find frame bits using Lagrange Multiplier illustrated in FIG. 7, which may be advantageous due to consuming less computation time than using the auto correlation technique. The DCT strength (energy) of a frame is a technique to find the number of bits needed for a frame and it is based on block basis (64×64). At least any one of the above is necessary based on the availability of computation/processing time. The ML module receives the four inputs as described above and predicts a Target Bit Allocation (TBA (n)) to be sent to the QP module 406.

Figure 9:
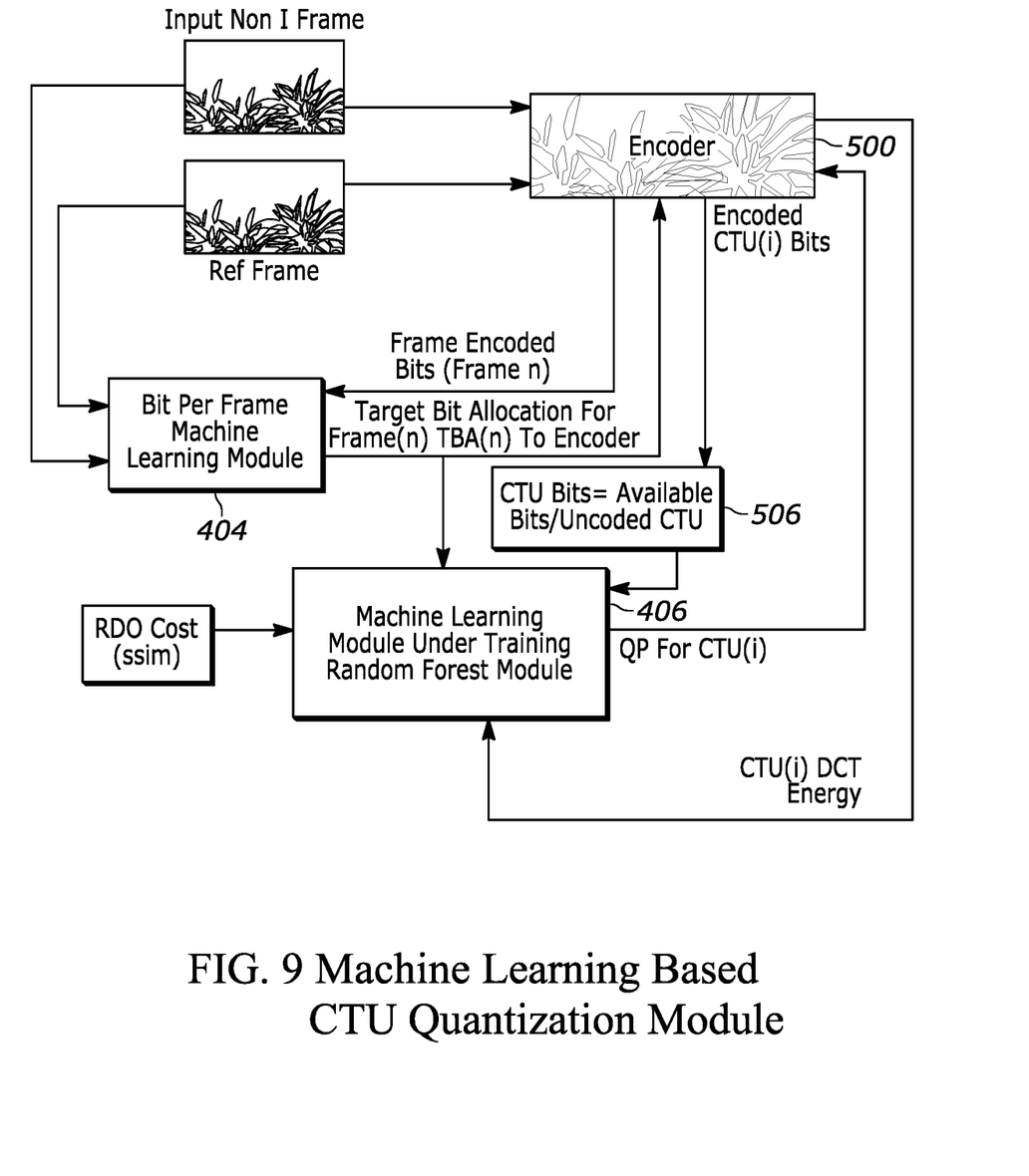
FIG. 9 illustrates and example ML model architecture in a training phase.

Turn now to FIG. 9 for an understanding of training the QP module 406. It will be appreciated that FIG. 9 is essentially the same as operation FIG. 5 with the following exceptions. The QP module 406 is trained on estimated (or target) frame bit from the frame bit module 404, the portion (such as a CTU or macroblock or other portion) DCT energy from the encoder 500 (before quantization), the portion (such as a CTU) bits 506, and an RDO cost 900.

With respect to the (ML-based) estimated frame bits, the frame bit module 404 provides an optimal available bit to the QP module. With respect to the DCT energy, the DCT strength (energy) of the block will help to find the Quantization Parameter and it is based on a block basis. The DCT energy will be sent after the DCT computation so there is no extra computation required. The portion bits are in a feedback loop which is updated periodically after every portion and gives direction to the QP Module to pick a correct Quantization Parameter. The RDO also helps the QP module discover a Quantization Parameter using one or both of expected quality metrics known as structural similarity index measure (SSIM) and peak signal to noise ratio (PSNR).

It may now be appreciated that the overall procedure described herein includes generating data, organizing the data, assessing the correlation between variables, and selecting an appropriate Machine Learning Module (in one implementation, Random Forest). Random Forest is a supervised ML algorithm for classification and regression problems. It builds decision trees on different samples and takes their majority vote for classification and average in case of regression. Present techniques may employ a supervised, regression machine learning technique. The technique may be supervised because both the features (data for the video) and the targets (QP) are available. During training, the features and targets are input to the ML model and it learns how to map the data to a prediction. Moreover, this is a regression task because the target value is continuous (as opposed to discrete classes in classification).

Another method to verify the quality of the data is make basic plots. Often it is easier to spot anomalies in a graph than in numbers.

The exact steps for preparation of the data will depend on the model used and the data gathered, but some amount of data manipulation will be required for any machine learning application.

During training and testing, data is split into training and testing sets. During training, the model 'sees' the answers, in this case the actual quantization value, so it can learn how to predict the quantization from the features. A relationship is expected between all the features and the target value, and the model learns this relationship during training. Then, when it comes time to evaluate the model, the model is tasked with making predictions on a testing set where it has access only to the features, not the final answers. The predictions are compared to ground truth answers for QP to judge how accurate the model is.

An example ML algorithm may be based on a decision tree technique. A decision tree is a classification as well as a regression technique. It works well when it comes to taking decisions on data by creating branches from a root, which are essentially the conditions present in the data, and providing an output known as a "leaf."

An example rate control algorithm may use Channel Rate in bits (bps)=$C_R$, Frame Rate (fps)=$F_R$,
Frame Bit Allocation Ave=$FBA_{ave}$=$(C_R/FR)$ (equation 1);

Accumulated Bit Buffer(n)=ABBuf(n)=$\Sigma i$ Frame Encoded Bits (n), i=0, n-1) (equation 2);

EstimatedBitAllocation (n)=EBA(n)=[$C_R$-ABBuf (n)]/[$F_R$-(n-1)] (equation 3).

It may now be appreciated that present principles provide a technique to find right quantization parameter value using ML modules. Present principles find optimal QP value to enhance video quality of every frame. Two pass computation aggressive methods are eliminated, which is beneficial because such two pass techniques are computationally expensive. Present principles also control and maintain the video rate buffer at a constant level which eliminates buffer overflow/underflow problems.

Figure 10:
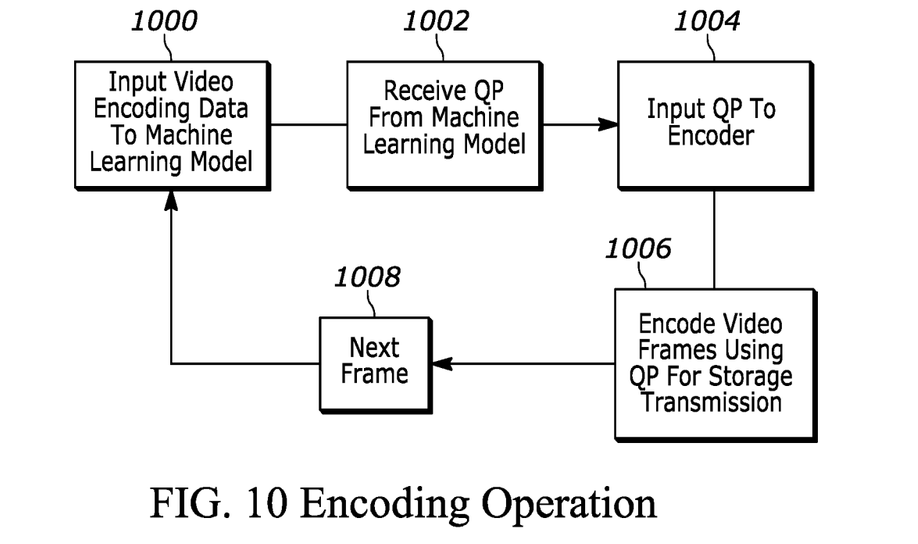
FIG. 10 illustrates example logic in example flow chart format for using the ML model during operation to encode video.
Figure 11:
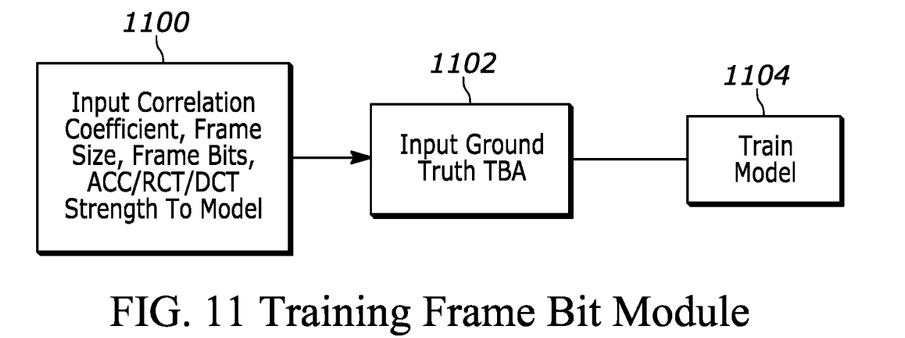
FIG. 11 illustrates example logic in example flow chart format for training the Frame Bit Module.
Figure 12:
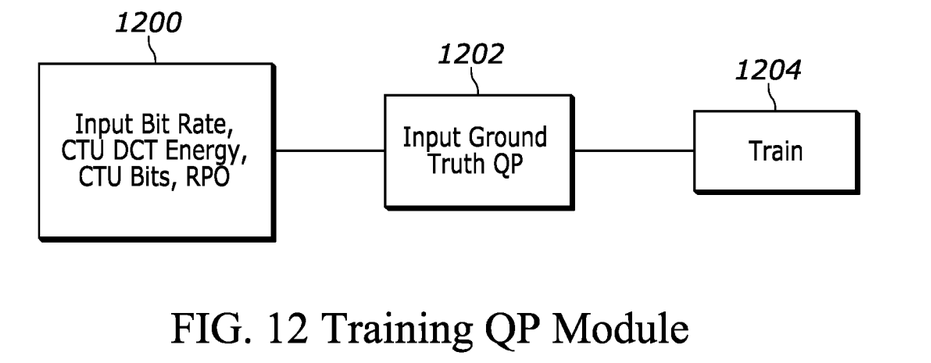
FIG. 12 illustrates example logic in example flow chart format for training the QP Module.

Turn now to the flow charts of FIGS. 10-12 for further exposition of techniques herein. Commencing at block 1000 in FIG. 10, video encoding information is input to the trained ML model. A QP for a frame (or part thereof such as a CTU) is received at block 1002, which is input at block 1004 to the encoder to encode the video at block 1006 using the QP. The video may be stored and/or transmitted to a player for presentation of the video. The next frame (or portion of a frame) is retrieved at block 1008 and the process loops back to block 1000.

FIG. 11 illustrates training of the frame bit module 404. Commencing at block 1100 the correlation coefficient, frame size, frame bits, and correlation strength are input to the module. Moving to block 1102, the ground truth target bit rate is input, and at block 1104 the model is trained to output an optimum target bit rate based on the training data.

FIG. 12 illustrates training of the QP module. Commencing at block 1200, bit rate, CTU DCT energy (or other frame subset energy), CTU bits (or other frame subset bits), and RDO (or other similarity measure) are input to the module. Ground truth QP is input at block 1202, and the module trained at block 1204 based on the training data.

While the particular embodiments are herein shown and described in detail, it is to be understood that the subject matter which is encompassed by the present invention is limited only by the claims.

What is claimed is:

1. An apparatus comprising:
at least one processor system configured to:
input to at least a first machine learning (ML) model at least one non-intraframe (I-frame), at least one I-frame, and at least a representation of bits for a video frame;
provide output from the first ML model to at least a first video encoder of a first encoder type, the output comprising at least a quantization parameter (QP);
execute the first video encoder to output at least one video frame based at least in part on the QP; and
execute at least a second ML model to generate QPs for non-reference frames for a second encoder type such that one ML model per encoder type is provided.

2. The apparatus of claim 1, wherein the representation of bits for a video frame is received from the video encoder.

3. The apparatus of claim 1, wherein the at least one processor system is configured to input to the first ML model encoded bits of at least one block of an encoded video frame.

4. The apparatus of claim 1, wherein the at least one processor system is configured to input to the first ML model a representation of energy of discrete cosine transform (DCT) of the at least one block of the encoded video frame.

5. The apparatus of claim 1, wherein the at least one processor system is configured to input to the video encoder the at least one non-I-frame and the at least one I-frame.

6. The apparatus of claim 1, wherein the processor system is configured to output a representation of estimated bits for at least one video frame.

7. The apparatus of claim 6, wherein the processor system is configured for receiving the non-I-frame, the at least one I-frame, and the representation of bits for a video frame and for outputting the representation of estimated bits to the video encoder.

8. The apparatus of claim 7, wherein the processor system is configured to receive from the encoder the encoded bits of at least one block of an encoded video frame and output to the video encoder the QP.

9. The apparatus of claim 8, wherein the processor system is configured to receive from the video encoder a representation of energy of DCT of the at least one block of the encoded video frame.

10. A method, comprising:
providing to at least a first machine learning (ML) module at least one indication of video transmission channel rate;
providing output of the first ML module to at least a second ML module, the output of the first ML module comprising at least an estimated number of bits for at least a portion of at least one video frame;
providing output of the second ML module to at least one video encoder, the output of the second ML module comprising at least one quantization parameter (QP);
using the QP by the video encoder to generate at least one video frame for transmission over a video transmission channel;
wherein the at least one ML module comprises a first ML model to generate QPs for a first encoder type and the method comprising executing a second ML model to generate QPs for a second encoder type such that one ML model per encoder type is provided.

11. An apparatus comprising:
at least one computer storage system that is not a transitory signal and that comprises instructions executable by at least one processor system to:
input video encoding information to at least one machine learning (ML) model;
provide output of the ML model to at least one video encoder, the output comprising at least a quantization parameter (QP) for at least a first non-intraframe (I frame);
execute the video encoder to encode video using the QP, wherein the at least one ML model comprises a first ML model to generate QPs for a first encoder type and the instructions are executable to execute a second ML model to generate QPs for a second encoder type such that one ML model per encoder type is provided.

12. The apparatus of claim 11, wherein the output comprises an estimated number of bits for at least one video frame.

13. The apparatus of claim 12, wherein the first ML model generates the QP based at least in part on the estimated number of bits for at least one video frame.

14. The apparatus of claim 11, wherein the video encoding information comprises at least a representation of encoded bits for at least one video frame.

15. The apparatus of claim 11, wherein the video encoding information comprises at least one non-intraframe (I-frame).

16. The apparatus of claim 11, wherein the video encoding information comprises at least one reference video frame.

17. The apparatus of claim 11, wherein the video encoding information comprises encoded bits of at least one block of an encoded video frame.

18. The apparatus of claim 11, wherein the video encoding information comprises a representation of energy of discrete cosine transform (DCT) of the at least one block of the encoded video frame.

19. The apparatus of claim 11, wherein the video encoding information comprises channel rate.

* * * * *

UNITED STATES PATENT AND TRADEMARK OFFICE
CERTIFICATE OF CORRECTION

| | |
|---|---|
| PATENT NO. | : 12,284,364 B2 |
| APPLICATION NO. | : 18/179256 |
| DATED | : April 22, 2025 |
| INVENTOR(S) | : Kannan Vairavan and Milan Mehta |

Page 1 of 1

It is certified that error appears in the above-identified patent and that said Letters Patent is hereby corrected as shown below:

On the Title Page

Column 1 (Assignee): Delete "Inc." and insert -- Inc., Tokyo (JP) --.

In the Claims

Column 12, Lines 32-33 (approx.): In Claim 11, delete "(QP) for at least a first non-intraframe (I frame);" and insert -- (QP); --.

Signed and Sealed this
Twenty-fourth Day of June, 2025

Coke Morgan Stewart
*Acting Director of the United States Patent and Trademark Office*